June 12, 1962    A. W. BROWN ETAL    3,038,632
CLOSURE DEVICE FOR TANKS
Filed May 22, 1958    4 Sheets-Sheet 1
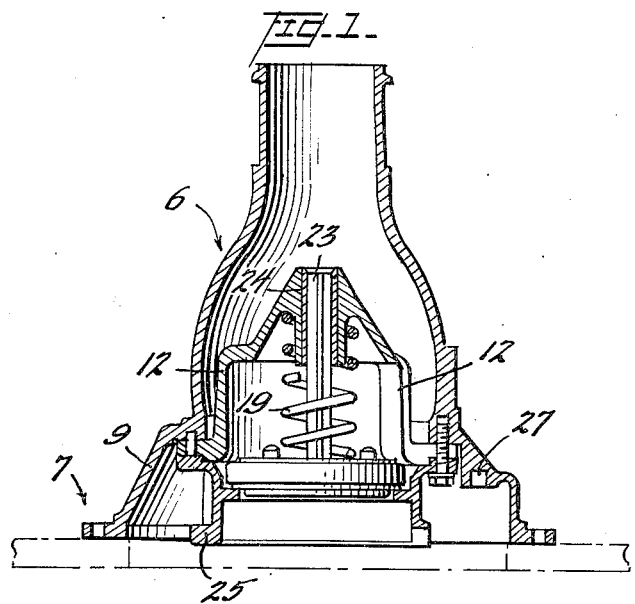
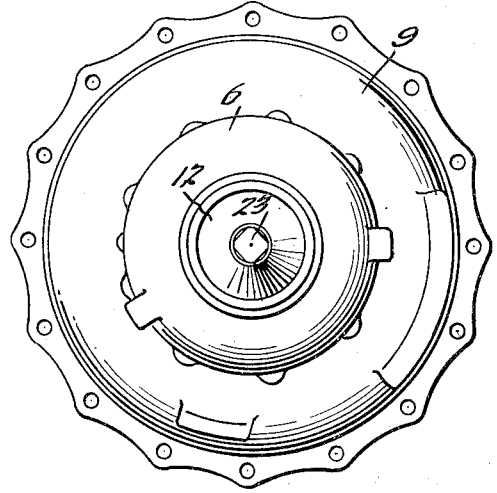 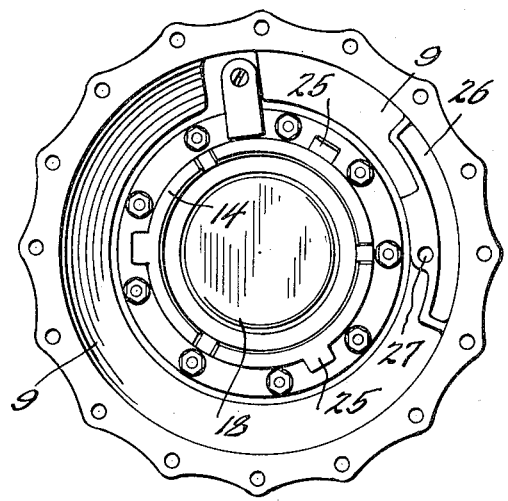
INVENTORS
Albert W. Brown,
Douglas R. Garrett.
BY
Moon, Porter, Diller & Stewart
ATTORNEY June 12, 1962  A. W. BROWN ETAL  3,038,632
CLOSURE DEVICE FOR TANKS
Filed May 22, 1958  4 Sheets-Sheet 2
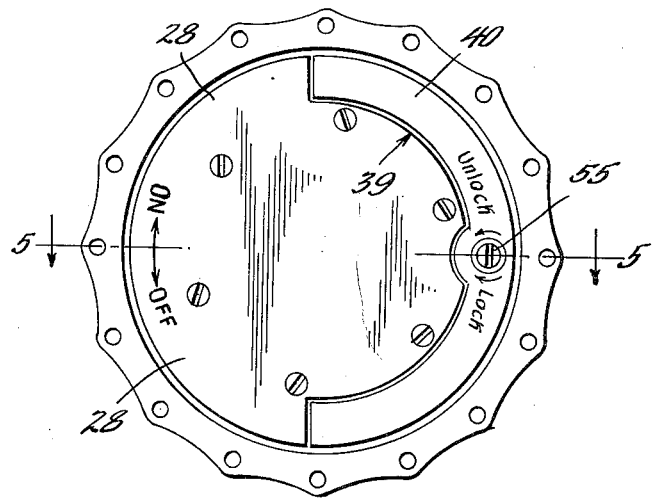
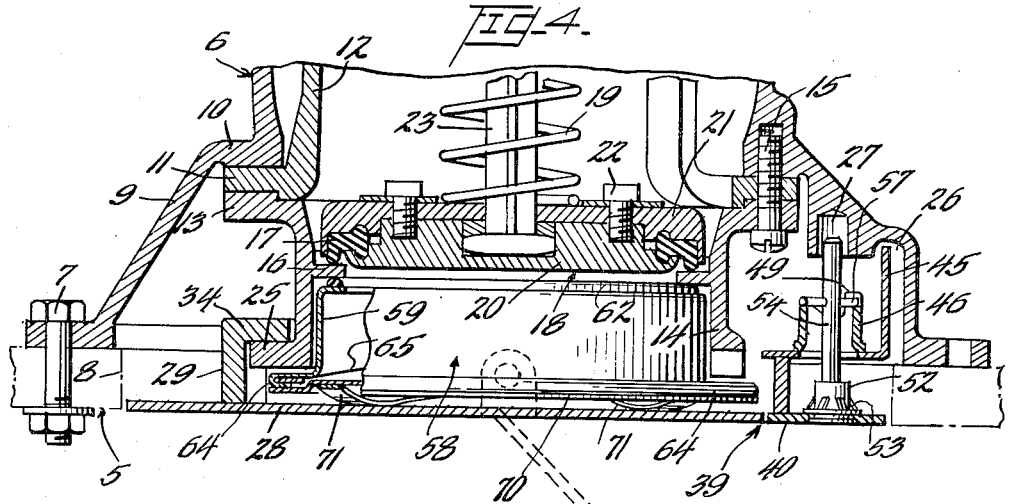
INVENTORS
Albert W. Brown,
Douglas R. Garrett.
BY
Mason, Porter,
ATTORNEY June 12, 1962 A. W. BROWN ETAL 3,038,632
CLOSURE DEVICE FOR TANKS
Filed May 22, 1958 4 Sheets-Sheet 3
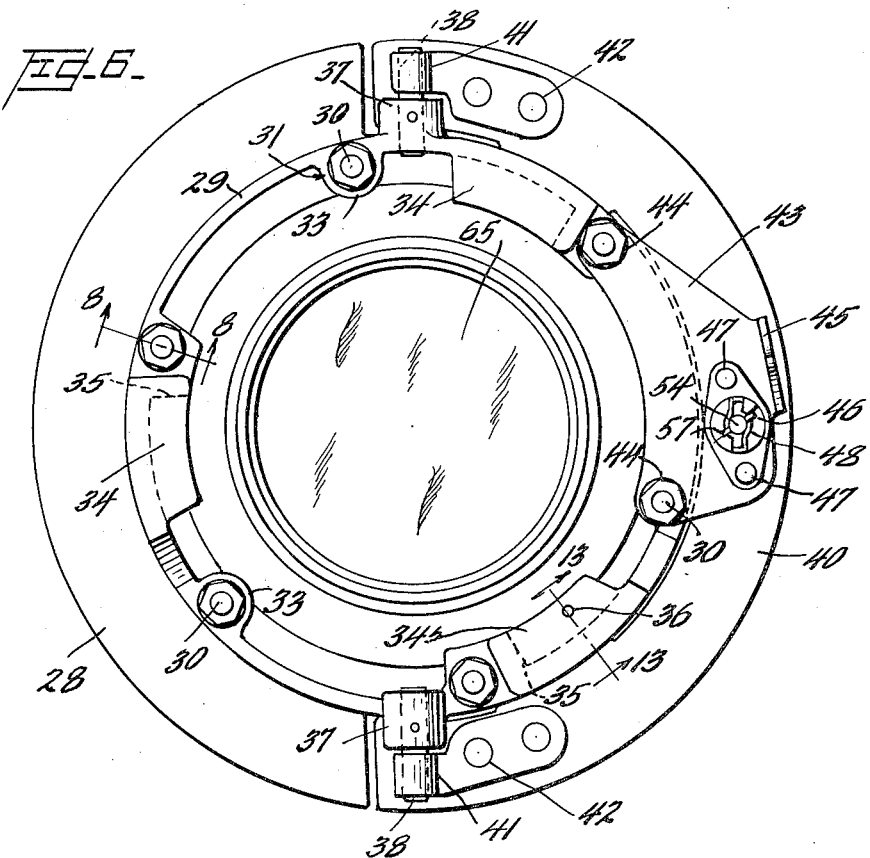
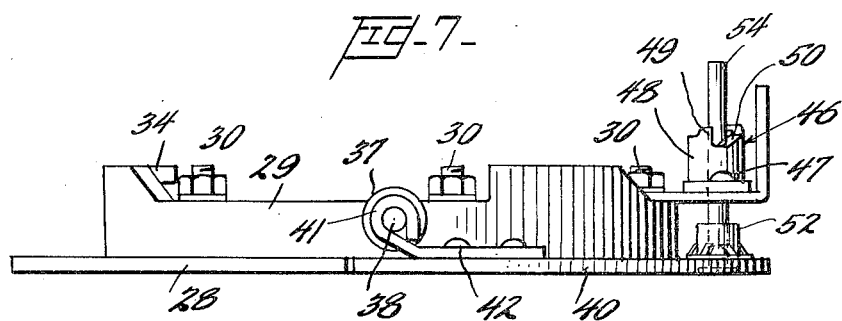
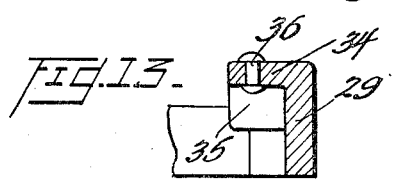
INVENTOR
Albert W. Brown,
Douglas R. Garrett.
BY Mason, Porter, Diller & Stewart
ATTORNEY June 12, 1962  A. W. BROWN ETAL  3,038,632
CLOSURE DEVICE FOR TANKS
Filed May 22, 1958  4 Sheets-Sheet 4
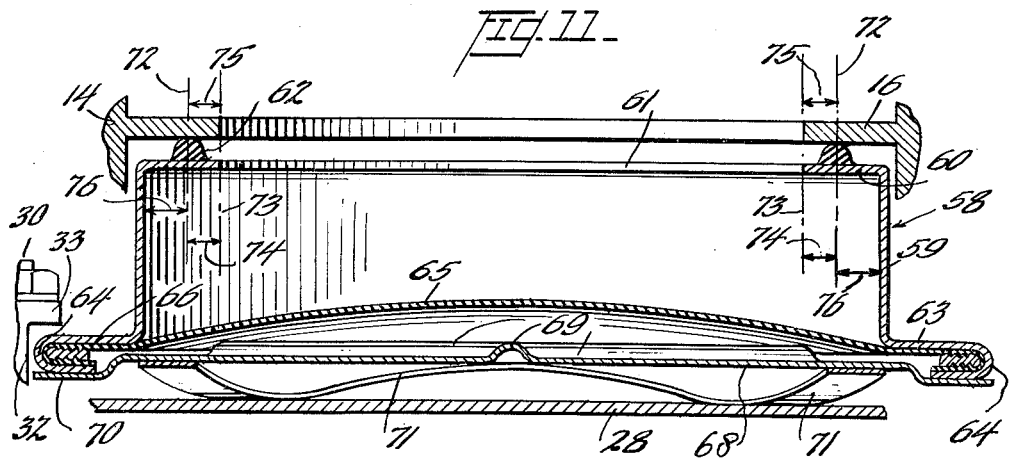
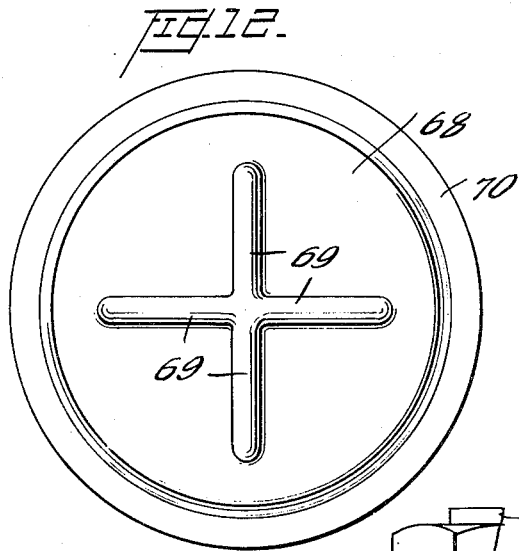
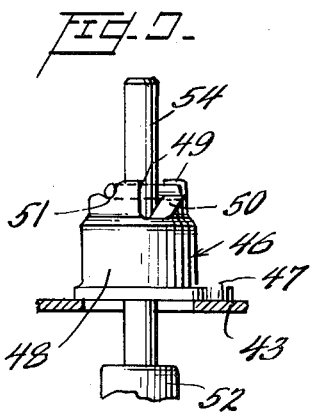
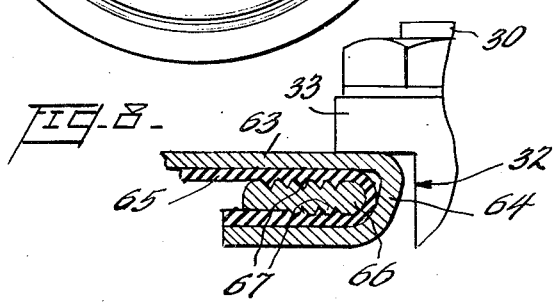
INVENTORS
Albert W. Brown,
Douglas R. Garrett.
BY Mason, Porter, Arthur & Owen
ATTORNEY United States Patent Office 3,038,632
Patented June 12, 1962

3,038,632
CLOSURE DEVICE FOR TANKS
Albert W. Brown, Balboa, and Douglas R. Garrett, Burbank, Calif., assignors to Parker-Hannifin Corporation, Cleveland, Ohio, a corporation of Ohio
Filed May 22, 1958, Ser. No. 737,023
8 Claims. (Cl. 220—46)

The present invention relates generally to closure caps for tanks, and more particularly to closure cap structures for closing an opening at the bottom of a tank through which the tank may be filled periodically or drained, and it primarily seeks to provide certain new and useful improvements in the type of closure disclosed in U.S. Letters Patent 2,757,819, issued to Everett H. Badger, Jr., on August 7, 1956.

It is at the present time common practice to provide airplanes of particular types with fuel impounding systems which can be refueled from below. In such systems the fuel tanks may be filled or drained from an opening in the bottom of the tanks or from an opening in a manifold which leads to several tanks where the opening is at a point lower than the level of the tanks. The opening is usually formed in a housing which is permanently attached to the tank or manifold. The housing is provided with means whereby a nozzle for either filling or draining the system may be conveniently attached and includes a valve, usually in the form of a spring closed check valve, for closing the opening when the nozzle is detached. Because of the great hazard incidental to any leakage of fuel past such a valve it is desirable to provide an additional means for sealing the opening as an added precaution against leakage. Such an additional sealing means has been disclosed in the prior patent to which reference is made hereinabove, and it is an object of the present invention to provide a closure cap structure of improved form and including such an auxiliary or safety sealing means which is simplified and improved in form over the form of seal shown in the prior patent.

Another object of the invention is to provide a closure device of the character stated wherein the closure cap carries a fuel leakage receiving chamber forming casing which is closed at its bottom by a flexible diaphragm and is provided at its top with an inwardly turned flange equipped with a sealing ring engaging a seat surrounding the valve sealed opening and sealing against egress of fuel leakage elsewhere except into said chamber, provision being made for causing pressure of fuel leaking into the chamber to be effective to hold said ring in sealing contact against said seat.

A further object of the invention is to provide an arrangement of the character stated wherein the leakage receiving chamber forming casing is floatably mounted on the closure cap and is pressed into sealing ring seating contact by spring means interposed between the cap and the casing.

It is another object of the invention to provide a closure means of the character stated including devices for positively locking the cap against inadvertent displacement, and also means for assuring that the cap will be so locked in a single proper sealing position.

Yet another object of the invention is to provide a closure means of the character stated wherein the valve carrying housing and the closure cap means have complementary locking lugs effective to hold the cap means in sealing contact on the housing and which are brought into cooperating contact through a turning movement of the cap, said cap having a bail-like handle swingable to a position for being grasped as a means for applying the desired turning movement to the cap.

A still further object of the invention is to provide a closure means of the character stated wherein the cap locking means comprises a locking pin carried by the bail-like handle and having a cross pin thereon, cam means on the cap and engageable by the cross pin when the handle is swung to a cap locking position, and a locking recess in the valve housing and into which the locking pin is receivable only when the cap means has been turned to a proper sealing position, said cross pin and cam means serving to hold the locking pin in said recess when the handle has been swung to its cap locking position and the locking pin has been properly turned against said cam means, and said handle serving as means indicating a cap unlocked condition when it is pendent, that is swung down away from its cap locking position.

With the above and other objects in view that will hereinafter appear, the nature of the invention will be more clearly understood by reference to the following detailed description, the appended claims and the several views illustrated in the accompanying drawings.

In the drawings:

FIGURE 1 is a central vertical cross section illustrating the spring seated valve housing with the closure cap removed therefrom.

FIGURE 2 is a top plan view, and FIGURE 3 a bottom plan view, of the housing shown in FIGURE 1.

FIGURE 4 is an enlarged fragmentary vertical cross section illustrating the closure cap in an auxiliary or safety seal mounting on the housing, the leakage receiving chamber forming casing being shown in part in elevation and in part in section, and the bail-like handle being shown swung away in dot and dash lines.

FIGURE 5 is an exterior face view of the closure cap mounted as shown in FIGURE 4.

FIGURE 6 is an interior face view of the closure cap removed from its housing mounting.

FIGURE 7 is an edge view of the closure cap shown in FIGURE 6.

FIGURE 8 is an enlarged fragmentary cross section taken on the line 8—8 on FIGURE 6.

FIGURE 9 is an enlarged detail side elevation illustrating the locking pin receiving and retaining cam.

FIGURE 10 is an enlarged fragmentary section showing the spring cup mounting of the locking pin in the bail-like handle.

FIGURE 11 is an enlarged fragmentary sectional view illustrating the floatably mounted leakage receiving chamber forming casing.

FIGURE 12 is a top plan view of the back-up plate which opposes the chamber sealing diaphragm.

FIGURE 13 is a fragmentary cross section taken on the line 13—13 on FIGURE 6.

In the practical development of the invention, the tank indicated at 5 has a valve housing generally designated 6 flange and bolt secured thereon at 7 over the opening 8. The housing has a downwardly flaring base portion 9 merging at its lower extremity into the mounting flange and at its upper portion into a horizontal mounting wall 10. To the mounting wall 10, the mounting flange 11 of a valve bearing spider 12 and the mounting flange 13 of a depending tubular skirt portion 14 are secured by screw means 15.

The skirt portion 14 has an inwardly directed seat flange 16 against the upper surface of which the yieldable sealing ring 17 of the valve head generally designated 18 is pressed by the spring 19. The ring 17 is clamped between the lower valve body 20 and the securing ring 21 which is attached thereto at 22, and the valve stem 23 which carries the valve head is vertically reciprocable in the spider guide sleeve 24. At its lower end the skirt portion 14 is equipped with a plurality of equidistantly spaced, outwardly extending bayonet lugs 25 as best shown in FIGURES 1, 3 and 4 and the purpose of these lugs will become apparent as this description progresses.

The flaring base portion 9 is equipped with thickening bosses in which are formed an arcuate slot or clearance 26 and a locking pin locating and receiving hole or recess 27, as best shown in FIGURES 1, 3 and 4, and the purpose of these parts will be described in greater detail hereinafter.

The removable safety closure cap is shown in detail in FIGURES 5, 6 and 7, and includes a face plate 28 to which a reinforcing and mounting ring 29 is secured by bolts 30 passing through the plate and through bosses 31 on the ring. Each said boss is provided with an inner face clearance 32 providing an overhanging shoulder 33 opposed to the plate in the manner clearly illustrated in FIGURES 8 and 11 and the purpose of these overhanging abutments will soon become apparent. The ring 29 also is equipped with a plurality of equidistantly spaced and inwardly directed bayonet lugs 34 each ending in a radial stop shoulder 35, as best shown in FIGURE 6, and disposed for interlocking cooperation with the bayonet lugs 25 of the depending skirt portion 14 in the manner clearly illustrated in FIGURE 4. One of the lugs 34 of the closure cap ring carries a detent pin 36 which projects downwardly therethrough in the manner clearly illustrated in FIGURE 13 so that the particular skirt lug 25 can ride over the pin and engage behind the same as it comes against the respective stop wall 35 to act as a retaining means preventing inadvertent turning of the lugs 34 relative to the stationarily mounted skirt lugs 25.

The ring 29 of the closure cap also is equipped with two radially projecting bearings 37 best shown in FIGURES 6 and 7 and equipped with radially outwardly projecting trunnions 38. The closure cap plate 28 is cut away at 39 as indicated in FIGURES 4 and 5 to provide a generally half-circular bail-like handle 40 completing the circular periphery of the plate and having bearings 41 affixed thereto at 42 and swingably mounted on the trunnions 38. A plate member 43 is secured at 44 to two of the bosses 31 and is equipped with a right angular projection 45 disposed to be receivable in the housing slot 26 in the manner clearly indicated in FIGURE 4. A cam member 46 is secured at 47 on the plate member 43, and its tubular body has an upwardly opening slotway 48 which is flanked by diametrically opposed stop projections 49. The cam member body also is provided with two diametrically opposed inclined cam surfaces 50 leading up to the stop projections 49 and terminating thereat in depressions or pin seats 51, as clearly indicated in FIGURE 9.

At its center, the bail-like handle 40 is apertured to receive a headed spring cup 52, the same being secured in place by a spring clutch ring 53 as best illustrated in FIGURES 4 and 10. The cup serves as a mounting for a locking pin 54. The locking pin projects through the cup 52 and its slotted head 55 seats in the cup entrance as illustrated in FIGURE 10, and a spring 56 within the cup engages the pin head and constantly tends to project the pin from the cup in the manner indicated in dotted lines in FIGURE 4. A cross pin 57 is carried by the locking pin 54 and is movable through the cam body slotway 48 and engageable with the cam portions 50 and pin seats 51, as well as the stops 49 which limit rotation of the pin in its cup mounting.

Floatably mounted on the closure cap is a fuel leakage chamber forming casing generally designated 58, the same being best illustrated in FIGURES 4 and 11. The casing 58 includes a cylindrical body wall 59 terminating at its upper end in an inwardly turned flange 60 providing a leakage receiving opening 61 and supporting a sealing ring 62 on its upper surface in position for engaging with the undersurface of the seat flange 16 of the tubular skirt portion 14. The cylindrical wall 59 terminates at its lower end in an outwardly turned flange 63, the latter being turned inwardly to form a hem 64 embracing the peripheral edge of a flexible diaphragm 65 which is turned about a grip ring 66 having ribbed upper and lower faces 67. When the leakage receiving chamber forming casing 58 is mounted on the closure cap the hem 64 is loosely received between the ring boss face clearances 32 and beneath the overhanging abutments 33 provided on the ring bosses by said face clearances. See FIGURES 8 and 11.

It will be apparent by reference to FIGURES 4 and 11 that the diaphragm 65 sealing the bottom of the leakage receiving chamber forming casing 58 is backed up by a rigid plate 68, said plate being reinforced or stiffened by the centrally disposed ribs 69. The downwardly offset peripheral margin 70 of the back-up plate 68 engages the casing hem 64 in the manner clearly illustrated in FIGURE 11, and the plate opposes and prevents any objectionable normal downward flexing of the diaphragm 65 such as might result from pressure application of leakage fluid within the casing 58 and tend to put the diaphragm under tension. A flat wavy spring 71 is interposed between the closure cap face plate 28 and the back-up plate 68 and serves to yieldably hold the plate 68 against the casing hem 64 and the casing sealing ring 62 in the sealing contact against the seat flange 16 of the depending tubular skirt 14. It should be understood also that the diaphragm 65 always will have sufficient area to permit it to follow up the back-up plate 68 without being placed in tension and tend to pull the safety seal ring 62 away from its sealing contact should a weakened or collapsed spring 71 permit a moving of the plate 68 away from its contact with the casing hem 64.

The lines 72—72 extending through the center or seal contact line of the sealing ring 62 as shown in FIGURE 11 and the lines 73—73 projected across the inner edge of the opening 61 into the leakage receiving chamber forming casing 58 define between them balancing upwardly and downwardly directed pressure receiving annuli respectively indicated at 74 and 75. Outwardly of the lines 72—72 or between said lines and the casing wall 59 there is presented a downwardly directed annulus against which pressure of any leakage fluid within the casing will act dominantly in an upwardly direction tending to hold the safety seal ring 62 against its seat as shown in FIGURE 11. Any pressure of leakage fluid applied between the casing flange 63 and the clamped peripheral margin of the diaphragm and acting upwardly against the flange 63 will balance out against like pressure acting downwardly against the portion of the diaphragm 65 opposed to said flange portion. It should also be understood that such pressure acting downwardly against the main body of the diaphragm 65 will be opposed by the mounted closure cap plate 28 and will be ineffective to move the casing 58 downwardly to any extent permitting unseating of the safety seal ring 62 because of the excess area provided in the diaphragm and effective to prevent the placing of the same under tension in the manner previously stated.

In the use of the assembly herein described in the refueling or discharging of a tank or system, it is to be understood that when the improved closure cap has been removed a refueling or fuel discharging nozzle may be mounted in the well known manner for displacing the main valve 20—17 upwardly against the action of the spring to permit the introduction or withdrawal of fuel through the housing 6. After the nozzle has been withdrawn the closure cap can be quickly and conveniently applied by placing the same over the opening 8 with the bayonet lugs 34 adjacent the skirt lugs 25 and pressing inwardly on the cap so as to permit turning thereof and interlocking engagement between the bayonet lugs to secure the cap in the position illustrated in FIGURE 4. During this application of the closure cap, as the safety seal ring 62 comes against the seat in the manner illustrated in FIGURE 11, the wavy spring 71 is compressed so that the casing hem 64 moves slightly away from the overhanging abutments 33 on the cap ring lugs 31, thus making the spring thereafter in part effective to hold the safety seal ring against its seat. Whenever the closure cap is removed, the spring holds the casing hem 64 against said abutments 33 and the casing 58 is held securely in its floatable mounting on the closure cap. The novel construction and arrangement of the casing 58 and its diaphragm 65 provides a very effective seal against egress of any fluid which may have leaked past the main valve 20—17 into the casing chamber, the diaphragm sealing against egress of the fluid through the bottom of the casing, and the differential pressure areas or annuli 74 and 76 assuring against displacement of the safety seal ring 62, and said ring 62 against leakage of fluid between the ring 62 and the skirt flange 16 engaged thereby. It is undesirable to provide seating spring means for seating the auxiliary or safety sealing means of such strength as to render the closure cap mounting process unnecessarily difficult. The arrangement of parts disclosed herein makes it possible to employ a spring 71 which will serve its intended purpose and yet will not unduly resist the pressure necessary to bring the cooperating bayonet lugs into proper locking relation.

When it is desired to remove or apply the closure cap the bail-like handle 40 of the face plate 28 can be swung down to a pendent position and used as a handle permitting turning of the cap in one direction or another with great facility. This handle can be quickly released by inserting a screw driver or a thin coin in the slot of the locking screw head 55 and turning the same in a manner for releasing the cross pin 57 from the cam member detents 51 and turning the same into position for permitting withdrawal thereof through the cam member slotway 48. Upon reapplication of the closure cap the plate projection 45 on the closure cap and the receiving slot 26 in the housing are brought together as primary locating devices, the cap is pressed inwardly and turned to bring the cooperating bayonet lugs into the securing relation illustrated in FIGURE 4, the lugs 34 of the cap being turned until the housing lugs 25 engage against the stops 35. This is the fully locked position and will be yieldably retained against inadvertent displacement by engagement of the detent pin 36 behind the particular housing lug 25 engaging the stop wall of the lug 34 carrying said pin. In this position, the closure cap will be so placed that the handle 40 can be swung up and the locking pin 54 projected through the cam member 46 and into the receiving recess 27 in the housing Unless this proper registry of parts has been brought about, the handle cannot be secured by turning of the pin 54 so as to cause the cross pin 57 to ride up the cam surfaces and become yieldably locked in the seats 51 with the locking pin in positive locking projection into the receiving recess 27 as shown in FIGURE 4. This provides a safety means in the form of a positive lock, and unless the handle 40 is so secured, it will remain pendent from its pivotal mountings 38 and serve as a visual indicator that the proper locked condition of the closure cap has not been attained.

While preferred example structure and arrangement of parts are disclosed herein, it is to be understood that said structure and arrangement may be variously modified without departing from the scope of the invention as defined in the appended claims.

We claim:
1. In combination, a housing having an upwardly and downwardly facing opening surrounded by a sealing seat, closure cap means including a face plate, sealing means carried by the plate and including a sealing ring engageable about the opening on said seat, cooperable means carried by said housing and said plate and effective upon turning of the plate for securing the cap means in place on the housing with said sealing ring in sealing contact against said seat, said sealing means comprising a casing having a body including an inwardly turned flange at its upper extremity and supporting the sealing ring and defining an opening through which fluid can enter the interior of the casing from the housing opening and an imperforate flexible diaphragm devoid of any intermediate opening uninterruptedly traversing the lower portion of the casing and forming a flexible bottom for said casing while sealing it against the passage of any fluid therethrough, and yieldable means backing up said diaphragm and casing and interposed between the diaphragm and the face plate, said inwardly turned flange presenting a pressure receiving annulus facing downwardly and effective when acted upon by fluid pressure within the casing to urge the sealing ring into sealing contact against the seat, said diaphragm having an area in excess of the area across the casing to permit downward flexure of the diaphragm upon yielding of the back-up means sufficient to prevent any tensioning of the diaphragm tending to move the casing so as to pull the sealing ring away from its sealing seat.

2. In combination, a housing having an upwardly and downwardly facing opening surrounded by a sealing seat, closure cap means including a face plate, sealing means carried by the plate and including a sealing ring engageable about the opening on said seat, cooperable means carried by said housing and said plate and effective upon turning of the plate for securing the cap means in place on the housing with said sealing ring in sealing contact against said seat, said sealing means comprising a casing having a body including an inwardly turned flange at its upper extremity and supporting the sealing ring and defining an opening through which fluid can enter the interior of the casing from the housing opening and a flexible diaphragm traversing the lower portion of the casing and sealing it against egress of said fluid, and yieldable means backing up said diaphragm and casing and interposed between the diaphragm and face plate, said inwardly turned flange presenting a pressure receiving annulus facing downwardly and effective when acted upon by fluid pressure within the casing to urge the sealing ring into sealing contact against the seat, said diaphragm having an area in excess of the area across the casing to permit downward flexure of the diaphragm upon yielding of the back-up means sufficient to prevent any tensioning of the diaphragm tending to move the casing so as to pull the sealing ring away from its sealing seat, said casing having thereon an outwardly extending hem in which the peripheral margin of the diaphragm is secured, and said plate having thereon means floatably embracing the hem and including overhanging shoulders against which the hem is held by the yieldable back-up means when the closure cap means is removed from the housing, said yieldable means permitting the casing hem to move away from its abutment contacting position when the sealing ring is engaged with the seat during the mounting of the closure cap means on the housing.

3. A combination as defined in claim 2 wherein the means for backing up the diaphragm comprises a rigid plate extending over the bottom of the casing and its flange and diaphragm, and spring means interposed between said rigid plate and the face plate.

4. A closure cap assembly for use in combination with a housing having an upwardly and downwardly facing opening surrounded by a sealing seat, said closure cap assembly comprising a face plate, sealing means carried by said face plate and including a sealing ring for sealing engagement with the sealing seat, means on said face plate for locking engagement with the housing, said sealing means including a casing having a body, said body having an upper end portion supporting said sealing ring, and defining an opening through which fluid can enter the interior of said casing, an outwardly turned flange at the lower end of said body, an imperforate flexible diaphragm devoid of any intermediate openings uninterruptedly traversing the lower portion of said casing and forming a flexible bottom for said casing while sealing said casing against the passage of any fluid therethrough, and yieldable means backing up said diaphragm and casing and interposed between said diaphragm and said face plate, said diaphragm being connected to said outwardly turned flange outwardly of said body, and having an area in excess of the area outlined by the connection between said diaphragm and said outwardly turned flange to permit downward flexure of said diaphragm upon yielding of said back-up means sufficient to prevent any tensioning of the diaphragm tending to unseat said sealing ring, and fluid under pressure entering between said diaphragm and said outwardly turned flange exerting a pressure on said outwardly turned flange tending to seat said sealing ring.

5. The closure cap assembly of claim 4 wherein said means for backing up said diaphragm comprises a rigid plate extending over the bottom of said casing, said outwardly turned flange and said diaphragm, and spring means interposed between said rigid plate and said face plate.

6. A closure cap assembly for use in combination with a housing having an upwardly and downwardly facing opening surrounded by a sealing seat, said closure cap assembly comprising a face plate, sealing means carried by said face plate and including a sealing ring for sealing engagement with the sealing seat, means on said face plate for locking engagement with the housing, said sealing means including a casing having a body, said body having an upper end portion supporting said sealing ring, and defining an opening through which fluid can enter the interior of said casing, an outwardly turned flange at the lower end of said body, a flexible diaphragm traversing the lower portion of said casing and sealing said casing against egress of fluid, and yieldable means backing up said diaphragm and casing and interposed between said diaphragm and said face plate, said diaphragm being connected to said outwardly turned flange outwardly of said body, and having an area in excess of the area outlined by the connection between said diaphragm and said outwardly turned flange to permit downward flexure of said diaphragm upon yielding of said back-up means sufficient to prevent any tensioning of the diaphragm tending to unseat said sealing ring, and fluid under pressure entering between said diaphragm and said outwardly turned flange exerting a pressure on said outwardly turned flange tending to seat said sealing ring, said outwardly turned flange terminating in a hem in which the peripheral margin of said diaphragm is secured, and said face plate having thereon means floatably embracing the hem and including overhanging shoulders against which the hem is held by said yieldable back-up means when said closure cap assembly is out of use, said yieldable back-up means permitting the casing hem to move away from its abutment contacting position when said sealing ring is seated.

7. A closure cap assembly for use in combination with a housing having an upwardly and downwardly facing opening surrounded by a sealing seat, said closure cap assembly comprising a face plate, sealing means carried by said face plate and including a sealing ring for sealing engagement with the sealing seat, means on said face plate effective upon turning of said face plate for securing said closure cap assembly in position and effecting the seating of said sealing ring, said sealing means including a casing having a body including an inwardly turned flange at its upper extremity and supporting the sealing ring and defining an opening through which fluid can enter the interior of the casing and an imperforate flexible diaphragm devoid of any intermediate openings uninterruptedly traversing the lower portion of said casing and forming a flexible bottom for said casing while sealing said casing against the passage of any fluid therethrough, and yieldable means backing up said diaphragm and casing and interposed between said diaphragm and said face plate, said inwardly turned flange presenting a pressure receiving annulus facing downwardly and effective when acted upon by fluid pressure within the casing to urge said sealing ring into a seated position, said diaphragm having an area in excess of the area across said casing to permit downwrd flexure of said diaphragm upon yielding of said back-up means sufficient to prevent any tensioning of said diaphragm tending to move said casing so as to unseat said sealing ring.

8. A closure cap assembly for use in combination with a housing having an upwardly and downwardly facing opening surrounded by a sealing seat, said closure cap assembly comprising a face plate, sealing means carried by said face plate and including a sealing ring for sealing engagement with the sealing seat, means on said face plate for locking engagement with the housing, said sealing means comprising a casing having a body including an inwardly turned flange at its upper extremity and supporting the sealing ring and defining an opening through which fluid can enter into the interior of the casing from the housing opening and an imperforate flexible diaphragm devoid of any intermediate openings uninterruptedly traversing the lower portion of the casing and forming a flexible bottom for said casing while sealing it against the passage of any fluid therethrough, and means backing up the diaphragm and the casing and interposed between the diaphragm and the face plate restricting movement of the casing and the flexure of the diaphragm to prevent any tensioning of the diaphragm tending to move the casing so as to pull the sealing ring away from its sealing seat, said inwardly turned flange presenting a pressure receiving annulus facing away from the sealing seat and effective when acted upon by the fluid pressure within the casing to urge the sealing ring into sealing contact against the sealing seat.

References Cited in the file of this patent

UNITED STATES PATENTS

| | | |
|---|---|---|
| 1,484,062 | Conner | Feb. 19, 1924 |
| 2,632,580 | Biddlecombe | Mar. 24, 1953 |
| 2,675,939 | Fraser | Apr. 20, 1954 |
| 2,728,483 | Smolen | Dec. 27, 1955 |
| 2,750,217 | Landholt | June 12, 1956 |
| 2,757,819 | Badger | Aug. 7, 1956 |
| 2,771,210 | Griswold | Nov. 20, 1956 |
| 2,772,809 | Ross | Dec. 4, 1956 |
| 2,839,215 | De Pew | June 17, 1958 |